United States Patent
Cheng (10) Patent No.: US 12,165,564 B2
(45) Date of Patent: Dec. 10, 2024

(54) PLUGGABLE DISPLAY SYSTEM AND POWER-ON METHOD THEREOF

(71) Applicant: BOE Technology Group Co., Ltd., Beijing (CN)

(72) Inventor: Xinyi Cheng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/637,819

(22) PCT Filed: Apr. 28, 2021

(86) PCT No.: PCT/CN2021/090745
§ 371 (c)(1),
(2) Date: Feb. 24, 2022

(87) PCT Pub. No.: WO2022/226849
PCT Pub. Date: Nov. 3, 2022

(65) Prior Publication Data
US 2024/0096261 A1    Mar. 21, 2024

(51) Int. Cl.
*G09G 3/20* (2006.01)
*H01R 12/73* (2011.01)
*H04N 7/10* (2006.01)

(52) U.S. Cl.
CPC .......... *G09G 3/2096* (2013.01); *H01R 12/73* (2013.01); *H04N 7/10* (2013.01); *G09G 2330/026* (2013.01); *G09G 2330/027* (2013.01)

(58) Field of Classification Search
CPC .......... G09G 3/2096; G09G 2330/026; G09G 2330/027; G09G 3/3406; G09G 2300/026;
(Continued)

(56) References Cited

U.S. PATENT DOCUMENTS

2010/0085988 A1* 4/2010 Fukuda .................. H04L 25/02
370/480
2013/0125191 A1   5/2013 Chen
(Continued)

FOREIGN PATENT DOCUMENTS

CN    101299678 A    11/2008
CN    108446139 A    8/2018
(Continued)

OTHER PUBLICATIONS

Interactive Whiteboard Open Pluggable Specification—China (OPS-C), Electrical, Mechanical, and Thermal Specification, Sep. 2014.

*Primary Examiner* — Michael E Teitelbaum
(74) *Attorney, Agent, or Firm* — Ling Wu; Stephan Yang; Ling and Yang Intellectual Property (57) ABSTRACT

The present disclosure discloses a pluggable display system, including a host subsystem and a panel subsystem. The host subsystem includes a first board connector, a master control module, and a plugging detection circuit. The panel subsystem includes a power supply module and an interface module. The interface module includes a second board connector. The plugging detection circuit is configured to detect a connection relation between the first board connector and the second board connector and send a detection result to the master control module. The master control module is configured to determine whether a start-up condition is satisfied according to the detection result of the plugging detection circuit if a standby signal is received, and send a power enable signal to the power supply module if the start-up condition is satisfied.

15 Claims, 6 Drawing Sheets

(58) Field of Classification Search
CPC .... G09G 2330/021; G09G 5/00; G09G 5/006; H01R 12/73; H04N 7/10; G06F 3/147
See application file for complete search history.

(56) References Cited

U.S. PATENT DOCUMENTS

2017/0262013 A1   9/2017   Juan et al.
2018/0088884 A1   3/2018   Fuller et al.

FOREIGN PATENT DOCUMENTS

| CN | 207937917 U | 10/2018 |
| CN | 208922161 U | 5/2019 |
| TW | 201322219 A1 | 6/2013 |

* cited by examiner

PLUGGABLE DISPLAY SYSTEM AND POWER-ON METHOD THEREOF

CROSS-REFERENCE TO RELATED APPLICATION

The present application is a U.S. National Phase Entry of International Application PCT/CN2021/090745 having an international filing date of Apr. 28, 2021. The entire contents of the above-identified application are hereby incorporated by reference.

TECHNICAL FIELD

The present disclosure relates to, but is not limited to, the field of display technology, and in particular to a pluggable display system and a power-on method therefor.

BACKGROUND

With popularization of new display products such as conference tablets and digital signages, display panel is becoming increasingly intelligent.

An intelligent display panel integrates a main board, an internal memory, a hard disk, a peripheral interface, etc., of a computer with a display panel, and is light and portable as a whole. However, a circuit system of the computer part is integrated with a circuit system of the display panel part, the whole intelligent display panel needs to be detected and repaired no matter the panel or the computer part fails. As a result, inconveniences are brought particularly to large-sized display products, and the cost and difficulties in maintenance are increased.

SUMMARY

The following is a summary of subject matters described in the present disclosure in detail. The summary is not intended to limit the scope of protection of the claims.

Embodiments of the present disclosure provide a pluggable display system and a power-on method therefor.

In a first aspect, an embodiment of the present disclosure provides a pluggable display system, which includes a host subsystem and a panel subsystem. The host subsystem includes a first board connector, a master control module, and a plugging detection circuit. The panel subsystem includes a power supply module and an interface module. The interface module includes a second board connector.

The plugging detection circuit is configured to detect a connection relation between the first board connector and the second board connector and send a detection result to the master control module.

The master control module is connected with the first board connector and the plugging detection circuit, and is configured to determine whether a start-up condition is satisfied according to the detection result of the plugging detection circuit if a standby signal is received, and send a power enable signal to the power supply module if the start-up condition is satisfied.

The power supply module is connected with the interface module, and is configured to send the standby signal to the master control module through the interface module and the first board connector if an input signal of an external power supply is detected and output multiplex of Direct-Current (DC) power supply signals to power the display system if the power enable signal is received.

In a second aspect, an embodiment of the present disclosure provides a power-on method for a pluggable display system, which includes:

A plugging detection circuit detects a connection relation between a first board connector and a second board connector, and sends a detection result to a master control module.

A power supply module sends a standby signal to the master control module through an interface module and the first board connector if an input signal of an external power supply is detected.

The master control module determines whether a start-up condition is satisfied according to the detection result of the plugging detection circuit after the standby signal is received, and sends a power enable signal to the power supply module if the start-up condition is satisfied.

The power supply module outputs multiplex direct-current power supply signals to power the display system if the power enable signal is received.

Other aspects will become apparent upon reading and understanding of the drawings and the detailed description.

BRIEF DESCRIPTION OF DRAWINGS

The accompanying drawings are used to, provide an understanding of technical solutions of the present disclosure and constitute a part of the specification, and are used to explain the technical solutions of the present disclosure together with the embodiments of the present disclosure, and not intended to form limitations on the technical solutions of the present disclosure.

FIG. 4-*a* is a schematic diagram (host subsystem side) of a plugging detection circuit according to an embodiment of the present disclosure.

FIG. 4-*b* is a schematic diagram (interface module) of a plugging detection circuit according to an embodiment of the present disclosure.

DETAILED DESCRIPTION

Multiple embodiments are described in the present application. However, the description is exemplary and unrestrictive. Moreover, it is apparent to those of ordinary skills in the art that there may be more embodiments and implementation solutions within the scope of the embodiments described in the present application. Although many possible feature combinations are shown in the drawings and discussed in the implementation modes, disclosed features may also be combined in many other manners. Unless specifically restricted, any feature or element of any embodiment may be combined with any other feature or element in any other embodiment for use, or may take the place of any other feature or element in any other embodiment.

The present application includes and conceives combinations of features and elements well known to those of ordinary skills in the art. The embodiments, features and elements that have been disclosed in the present application may be combined with any conventional features or elements to form unique inventive solutions defined by the claims. Any feature or element of any embodiment may be combined with a feature or an element from another inventive solution to form another unique inventive solution defined by the claims. Therefore, it is to be understood that any feature shown and/or discussed in the present application may be implemented independently or in any appropriate combination. Therefore, no other limits are made to the embodiments, except limits made by the appended claims and equivalent replacements thereof. In addition, various modifications and variations may be made within the scope of protection of the appended claims.

In addition, a method and/or a process may already be presented as a specific step sequence in the specification when a representative embodiment is described. However, the method or the process should not be limited to the steps of the specific order on the premise that the method or the process is independent of the specific order of the steps. As understood by those of ordinary skills in the art, other orders of steps are also possible. Therefore, the specific orders of steps described in the specification should not be explained as a limitation on the claims. Moreover, the execution of the steps of the method of the process in the claims for the method and/or the process should not be limited to the written sequence, and it can be easily understood by those skilled in the art that these sequences may be changed and still fall within the spirit and scope of the embodiments of the present application.

Figure 1:
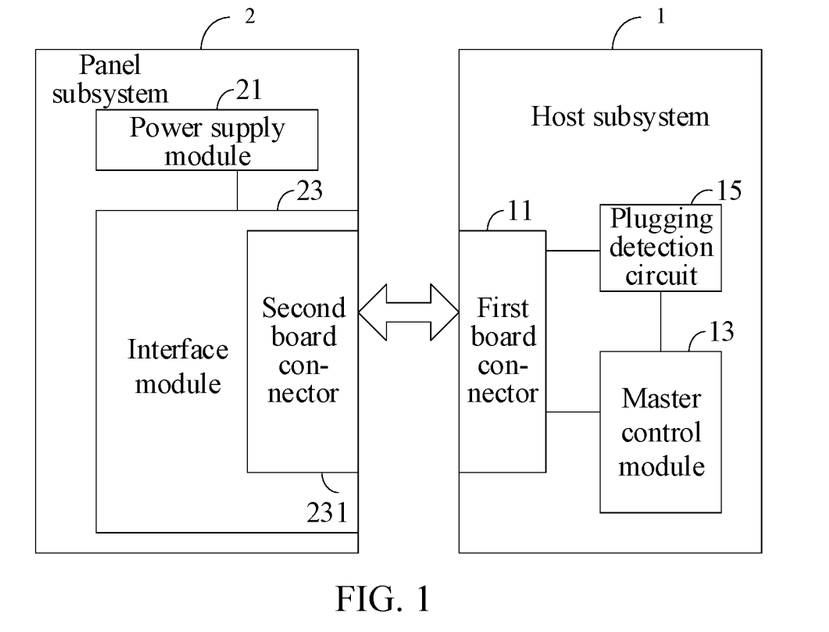
FIG. 1 is a schematic structural diagram of a pluggable display system according to an embodiment of the present disclosure.

FIG. 1 is a schematic structural diagram of a pluggable display system according to an embodiment of the present disclosure. As shown in FIG. 1, the pluggable display system may include a host subsystem 1 and a panel subsystem 2. The host subsystem includes a first board connector 11, a master control module 13 and a plugging detection circuit 15. The panel subsystem includes a power supply module 21 and an interface module 23. The interface module includes a second board connector 231.

The plugging detection circuit is configured to detect a connection relation between the first board connector and the second board connector and send a detection result to the master control module.

The master control module is connected with the first board connector and the plugging detection circuit, and is configured to determine whether a start-up condition is satisfied according to the detection result of the plugging detection circuit if a standby signal is received, and send a power enable signal to the power supply module if the start-up condition is satisfied.

The power supply module is connected with the interface module, and is configured to send the standby signal to the master control module through the interface module and the first board connector if an input signal of an external power supply is detected by the power supply module and output multiplex direct-current power supply signals to power the display system if the power enable signal is received.

In some exemplary implementation modes, the host subsystem has a detachable structure. The host subsystem is detachably connected with the panel subsystem through the first board connector and the second board connector. For example, the first board connector and the second board connector are pluggable connectors. The first board connector is a plug, and the second board connector is a socket.

In this embodiment, the display system includes the host subsystem and the panel subsystem. The first board connector is arranged in the host subsystem, and the second board connector is arranged in the panel subsystem, so that the host subsystem may be detachably connected with the panel subsystem. The detachable connection between the host subsystem and the panel subsystem can facilitate troubleshooting and overhauling of the display system as well as function upgrading of the display system. The display system provides plugging information for the master control module through the plugging detection circuit, and provides power-on information of a power supply for the master control module through a power-on detection mechanism of the power supply module. The master control module determines whether the start-up condition is satisfied according to the detection result of the plugging detection circuit after the power supply module is powered on, and sends the power enable signal to the power supply module if the start-up condition is satisfied. The power supply module outputs multiplex direct-current power supply signals to power the display system if the power enable signal is received. Since the power supply module powers the display system under the control of the master control module rather than directly powering the display system after powered on, so that damages possibly brought by plugging operations are avoided, and electrical safety of the system is ensured.

In some exemplary implementation modes, the power supply module is configured to send the standby signal to the master control module through the interface module and the first board connector in the following manner:

the power supply module outputs the standby signal to a standby signal terminal of the second board connector if the input signal of the external power supply is detected.

When the first board connector is connected with the second board connector, all signal terminals of the first board connector and the second board connector are correspondingly connected one to one.

In the above-mentioned implementation mode, after the power supply module is powered on, the master control module may not receive any standby signal if the first board connector is not connected with the second board connector, and the master control module can receive the standby signal only when the first board connector is connected with the second board connector.

In some exemplary implementation modes, the standby signal may be a direct-current signal with a fixed voltage value. For example, the standby signal may be a 5V direct-current signal. If the power supply module is not powered-on, no 5V direct-current signal may be output to the standby signal terminal of the second board connector, and the master control module will not receive the 5V standby signal. When the power supply module is powered on, the master control module may receive the 5V standby signal if the first board connector is connected with the second board connector, and may not receive any 5V standby signal if the first board connector is not connected with the second board connector. Therefore, the master control module may receive the 5V standby signal only when the power supply module is powered on and the two board connectors are connected together.

In some exemplary implementation modes, the master control module is further configured to, if start-up mode setting information input by a user is received after the display system is started up, store the information, and hold a default start-up mode for starting up the system if the start-up mode setting information input by the user is not received.

In some exemplary implementation modes, the start-up mode includes a manual mode and an automatic mode. The automatic mode includes a delayed start mode and a non-delayed start mode. Delay time of the delayed start mode may be selected or self-defined by the user. The system may have default delay time if the user does not set the delay time. The default start-up mode for powering on the system is the manual mode or the delayed start mode.

In some exemplary implementation modes, the manual start-up mode refers to triggering start-up by human-computer interactions. For example, the user may trigger start-up by operating a button of a remote controller, a button on a body of the device, etc.

In some exemplary implementation modes, the master control module is configured to determine whether the start-up condition is satisfied according to the detection result of the plugging detection circuit in the following manners:
  if the first board connector is connected with the second board connector for the first time, or the master control module has never sent any power enable signal to the power supply module after a last disconnected status between the first board connector and the second board connector is switched to a connected status, determining whether the start-up condition is satisfied according to the default start-up mode; and
  if the master control module has ever sent a power enable signal to the power supply module after the last disconnected status between the first board connector and the second board connector is switched to the connected status, querying the start-up mode setting information, if the user sets a start-up mode, determining whether the start-up condition is satisfied according to the start-up mode set by the user, and if the user does not set the start-up mode, determining whether the start-up condition is satisfied according to the default start-up mode.

In some exemplary implementation modes, the master control module is configured to determine whether the start-up condition is satisfied according to the default start-up mode of the system in the following manners:
  waiting for receiving a manual trigger signal if the default start-up mode of the system is the manual mode, and determining that the start-up condition is satisfied if the manual trigger signal is received; and
  determining that the start-up condition is satisfied after waiting for the delay time if the default start-up mode of the system is the delayed start mode.

In some exemplary implementation modes, the master control module is configured to determine whether the start-up condition is satisfied according to the start-up mode set by the user in the following manners:
  waiting for receiving a manual trigger signal if the start-up mode set by the user is the manual mode, and determining that the start-up condition is satisfied if the manual trigger signal is received;
  determining that the start-up condition is satisfied after waiting for the delay time if the start-up mode set by the user is the delayed start mode; and
  determining that the start-up condition is satisfied if the start-up mode set by the user is the non-delayed start mode.

In the above-mentioned implementation mode, after the first connection or every reconnection between the host subsystem and the panel subsystem, a start-up flow is executed according to the default start-up mode of the system if the system is started up for the first time, a start-up flow is executed according to the start-up mode set by the user if the system is not started up for the first time, or a start-up flow is executed according to the default start-up mode of the system if the user does not set the start-up mode. Since the host subsystem may be connected with the panel subsystem when the power supply module is powered-on, use of the default start-up mode of the system (the manual mode or the delayed start mode) may can power-on reliability of the system and avoid electric sparks caused by power-on in case of unreliable connection or connection jitter between the two board connectors.

In some exemplary implementation modes, the master control module is further configured to send a power disable signal to the power supply module when a request of disconnecting the first board connector from the second board connector or a power-off request is received.

The power supply module is further configured to stop outputting other power supply signals except the standby signal if the power disable signal is received.

In some exemplary implementation modes, the operation of sending the request of disconnecting the first board connector from the second board connector or the power-off request to the master control module may be implemented by human-computer interactions. For example, the user may send the request of disconnecting the first board connector from the second board connector or the power-off request to the master control module through an application program.

In the above-mentioned implementation mode, the disconnection request is sent at first to the system by human-computer interactions to stop the power supply from powering the display system. As such, the electrical safety of disconnection between the two board connectors when the power supply is on can be improved.

In some exemplary implementation modes, the power supply module is configured to output the multiplex direct-current power supply signals to power the display system according to the power enable signal sent by the master control module in the following manner:
  converting an Alternating-Current (AC) voltage signal input by the external power supply into multiplex direct-current voltage signals for output, wherein part of the multiplex direct-current voltage signals are provided for the panel subsystem, and the other part of the multiplex direct-current voltage signals are provided for the host subsystem through the connection between the second board connector and the first board connector.

In the above-mentioned implementation mode, the power supply module is responsible for powering the whole display system after receiving the power enable signal. The power supply module converts the alternating-current voltage signal input by the external power supply into the multiplex direct-current voltage signals for output, wherein part of the direct-current power supply signals are provided for the panel subsystem, and the other part of the direct-current power supply signals are provided for the host subsystem.

Figure 2:
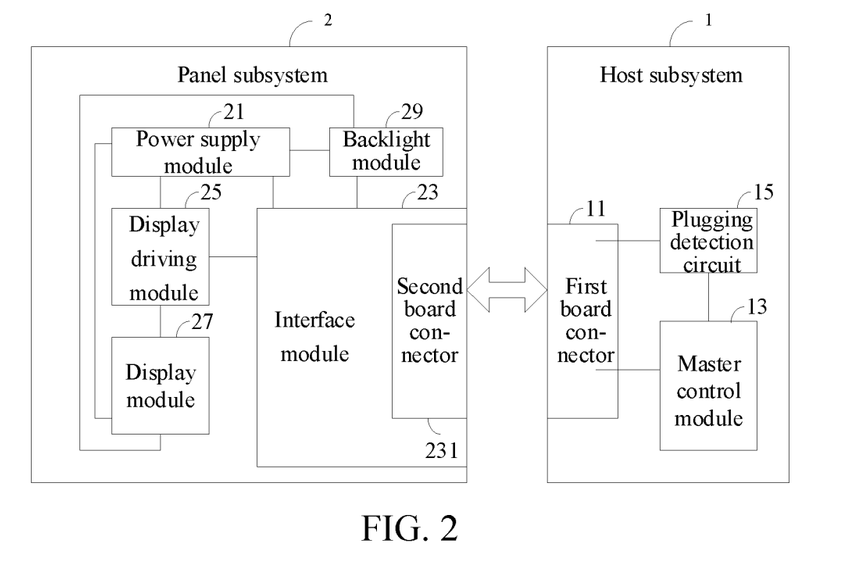
FIG. 2 is a schematic structural diagram (including a backlight module) of a pluggable display system according to an embodiment of the present disclosure.

In some exemplary implementation modes, as shown in FIG. 2, the panel subsystem further includes a display driving module 25, a display module 27 and a backlight module 29.

The master control module is further configured to load a software system after power-on and sequentially output a brightness control signal and a light emitting enable signal to the backlight module through the first board connector and the interface module after loading is completed.

The backlight module is connected with the display module and the interface module, is connected with the master control module through the interface module and the second board connector, and is configured to provide a light source signal for the display module under the control of the master control module.

In the above-mentioned implementation mode, the master control module further loads the software system after power-on, and sequentially outputs the brightness control signal and the light emitting enable signal to the backlight module after the loading is completed. The backlight module turns on a screen after receiving the light emitting enable signal.

In some exemplary implementation modes, the master control module is further configured to send a light emitting disable signal to the backlight module through the first board connector and the interface module when receiving a request of disconnecting the first board connector from the second board connector or a power-off request.

The backlight module is further configured to control a screen to be turned off when receiving the light emitting disable signal.

Figure 3:
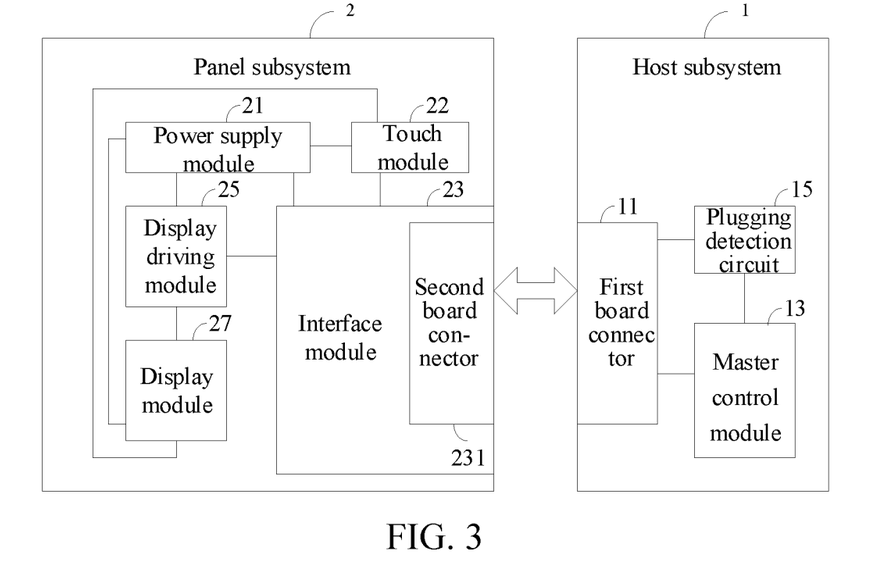
FIG. 3 is a schematic structural diagram (including a touch module) of a pluggable display system according to an embodiment of the present disclosure.

In some exemplary implementation modes, as shown in FIG. 3, when the display module includes a touch panel, the panel subsystem further includes a touch module 22.

The touch module is connected with the display module and the interface module, is connected with the master control module through the interface module and the second board connector, and is configured to acquire a touch signal and send the touch signal to the master control module under the control of the master control module.

Figure 4A:
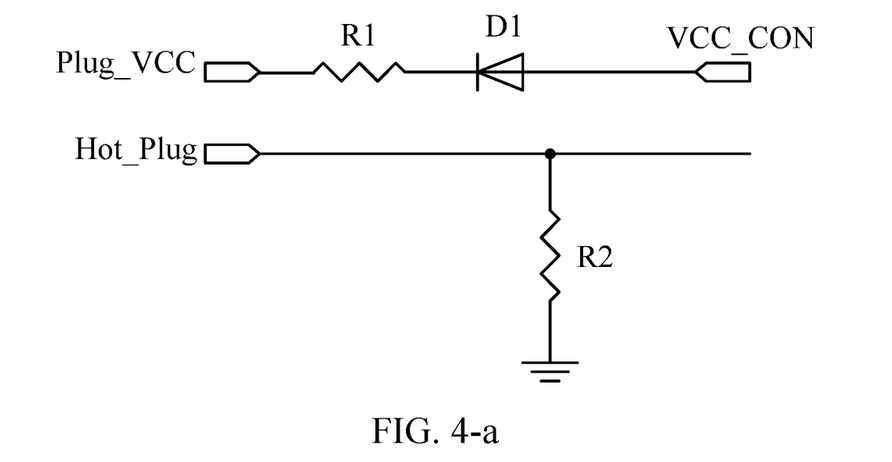

In some exemplary implementation modes, as shown in FIG. 4-a, the plugging detection circuit includes a first resistor R1, a second resistor R2 and a first diode D1.

A first end of the first resistor is connected with a plug power supply signal terminal Plug_VCC of the first board connector, and a second end of the first resistor is connected with a cathode of the first diode. An anode of the first diode is connected with a first power supply signal terminal VCC_CON.

A first end of the second resistor is connected with a hot plug signal terminal Hot_Plug of the first board connector, and a second end of the second resistor is grounded. The hot plug signal terminal Hot_Plug is further connected with the master control module as an output end of the plugging detection circuit.

The first power supply signal terminal VCC_CON is configured to provide an uninterrupted power supply signal.

Figure 4B:
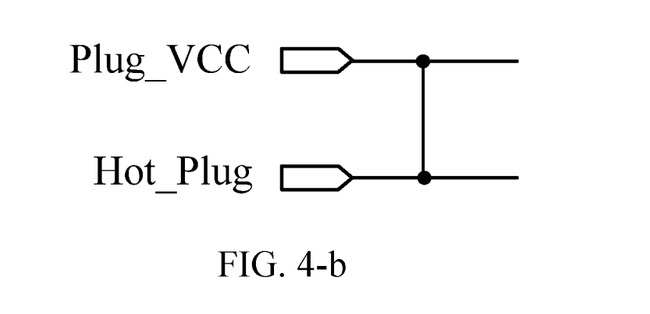

As shown in FIG. 4-b, the second board connector includes a plug power supply signal terminal Plug_VCC and hot plug signal terminal Hot_Plug which are in one-to-one correspondence with the first board connector. The plug power supply signal terminal and the hot plug signal terminal are short-circuited at the second board connector.

In the above-mentioned implementation mode, when the first board connector is connected with the second board connector, the first resistor and the second resistor form a voltage division circuit to perform voltage division on a voltage signal of the first power supply signal terminal. If a voltage value of the voltage signal of the first power supply signal terminal is $V_{in}$, a voltage value $V_{out}$ of a voltage signal of the output end of the plugging detection circuit is $V_{out}=V_{in}*(r2/(r1+r2))$, where r2 represents resistance of the resistor R2, and r1 represents resistance of the resistor R1. When the first board connector is not connected with the second board connector, the plug power supply signal terminal Plug_VCC and the hot plug signal terminal Hot_Plug of the first board connector are suspended. In such case, the voltage value $V_{out}$ of the voltage signal of the output end of the plugging detection circuit is 0. The plugging detection circuit notifies the master control module whether the host subsystem is connected with the panel subsystem by outputting signals with different voltages.

In some exemplary implementation modes, the host subsystem further includes a real-time clock module and a real-time clock power supply circuit. The real-time clock module is connected with the master control module, and is configured to continuously record time information and send the time information to the master control module.

The real-time clock power supply circuit is configured to use a direct-current power supply signal output by the power supply module as an input power supply signal when the power supply module is powered on, use a direct-current power supply signal output by a battery as an input power supply signal when the power supply module is off, generate an uninterrupted power supply signal according to the input power supply signal, and output the uninterrupted power supply signal to the real-time clock module at an output end of the real-time clock power supply circuit.

Figure 5:
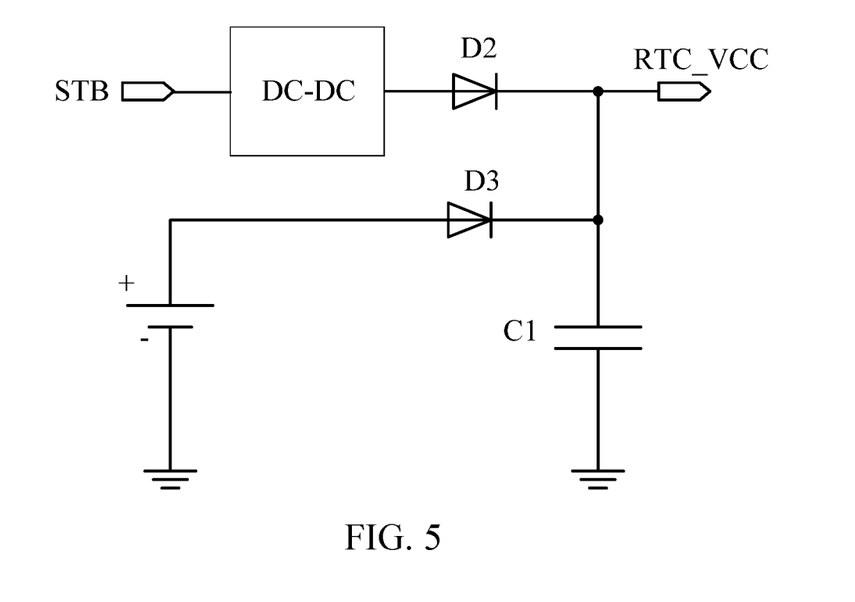
FIG. 5 is a schematic diagram of a real-time clock power supply circuit according to an embodiment of the present disclosure.

In some exemplary implementation modes, as shown in FIG. 5, the real-time clock power supply circuit includes a direct-current voltage conversion sub-circuit DC-DC, a second diode D2, a third diode D3 and a first capacitor C1.

An input end of the direct-current voltage conversion sub-circuit is connected with a standby signal terminal STB of the first board connector, and an output end of the direct-current voltage conversion sub-circuit is connected with an anode of the second diode. The direct-current voltage conversion sub-circuit is configured to perform voltage reduction processing on an input direct-current voltage signal to generate a new direct-current voltage signal for output. A cathode of the second diode is connected with the output end RTC_VCC of the real-time clock power supply circuit.

An anode of the third diode is connected with a cathode of the battery, and a cathode of the third diode is connected with the output end of the real-time clock power supply circuit. An anode of the battery is grounded.

A first electrode of the first capacitor is connected with the output end of the real-time clock power supply circuit, and a second electrode of the first capacitor is grounded.

A voltage value of the standby signal output at the standby signal terminal when the power supply module is powered on is higher than a cathode voltage of the battery.

In the above-mentioned implementation mode, the power supply module outputs the standby signal when is powered on. Since the voltage value of the standby signal is higher than the cathode voltage of the battery, the third diode is turned off, and the standby signal provides an input voltage signal for the real-time clock power supply circuit. That is, an external power supply of the power supply module powers the real-time clock module, and the power consumption of the battery is zero. When the power supply module is off, the battery provides an input voltage signal for the real-time clock power supply circuit. That is, the battery continues powering the real-time clock module.

In some exemplary implementation modes, the first power supply signal terminal is connected with the output end of the real-time clock power supply circuit. In this implementation mode, the output end of the real-time clock power supply circuit serves as both a power supply end of the real-time clock module and a signal input end of the uninterrupted power supply signal of the plugging detection circuit.

In some exemplary implementation modes, the pluggable display system includes a conference tablet, an intelligent white-board, a digital signage, etc.

In some exemplary implementation modes, the first board connector includes a JAE (Japan Aviation Electronics) plug interface, and the second board connector includes a JAE socket interface. For example, the first board connector includes a JAE TX25A plug interface, and the second board connector includes a JAE TX24A socket interface.

The following Table 1 shows a signal set between the panel subsystem and a host subsystem designed using the JAE TX25A plug interface (80-pin) and the JAE TX24A socket interface in the present disclosure.

TABLE 1

| Interface signal | |
|---|---|
| Pin | Signal |
| 1 | +12 V |
| 2 | +12 V |
| 3 | +12 V |
| 4 | +12 V |
| 5 | +12 V |
| 6 | +12 V |
| 7 | +12 V |
| 8 | NC |
| 9 | GND |
| 10 | GND |
| 11 | VBO_SCL |
| 12 | VBO_SDA |
| 13 | GND |
| 14 | VBO_HTPDN |
| 15 | VBO_LOCKN |
| 16 | GND |
| 17 | VBO0+ |
| 18 | VBO0− |
| 19 | GND |
| 20 | VBO1+ |
| 21 | VBO1− |
| 22 | GND |
| 23 | VBO2+ |
| 24 | VBO2− |
| 25 | GND |
| 26 | VBO3+ |
| 27 | VBO3− |
| 28 | GND |
| 29 | VBO4+ |
| 30 | VBO4− |
| 31 | GND |
| 32 | VBO5+ |
| 33 | VBO5− |
| 34 | GND |
| 35 | VBO6+ |
| 36 | VBO6− |
| 37 | GND |
| 38 | VBO7+ |
| 39 | VBO7− |
| 40 | GND |
| 41 | GND |
| 42 | GND |
| 43 | GND |
| 44 | GND |
| 45 | GND |

TABLE 1-continued

| Interface signal | |
|---|---|
| Pin | Signal |
| 46 | GND |
| 47 | PWR_Status |
| 48 | Hot_Plug |
| 49 | Plug_VCC |
| 50 | AD_Key |
| 51 | IR |
| 52 | GND |
| 53 | ADJ |
| 54 | BL_ON/OFF |
| 55 | GND |
| 56 | TP_USB_DM |
| 57 | TP_USB_DP |
| 58 | GND |
| 59 | TP_SCL |
| 60 | TP_SDA |
| 61 | TP_INT |
| 62 | TP_RST |
| 63 | GND |
| 64 | Speaker_RN |
| 65 | Speaker_RP |
| 66 | Speaker_LN |
| 67 | Speaker_LP |
| 68 | SYS_FAN |
| 69 | Reserved |
| 70 | Reserved |
| 71 | Reserved |
| 72 | Reserved |
| 73 | Reserved |
| 74 | GND |
| 75 | Standby_ON/OFF |
| 76 | STB |
| 77 | GND |
| 78 | GND |
| 79 | 5 V |
| 80 | 5 V |

Figure 6:
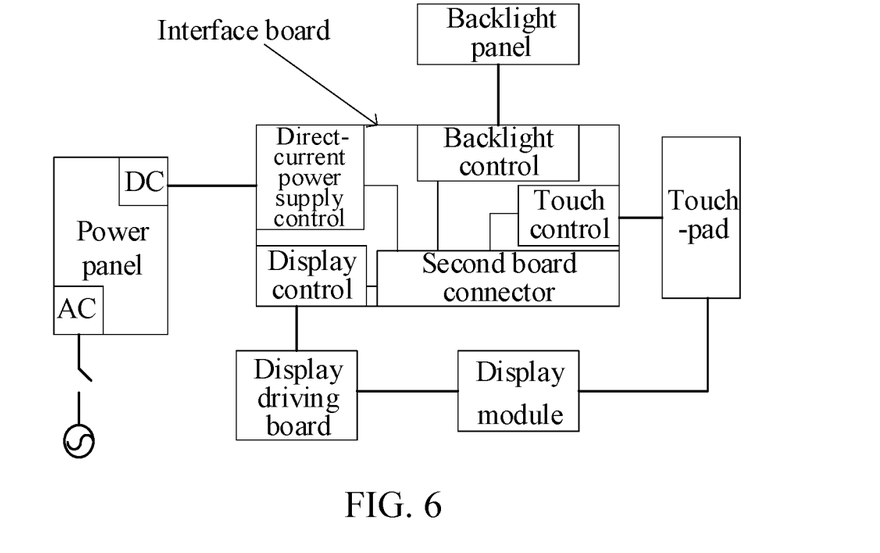
FIG. 6 is a schematic structural diagram of a panel subsystem according to an embodiment of the present disclosure.

FIG. 6 is a schematic structural diagram of a panel subsystem of a pluggable display system according to an embodiment of the present disclosure. As shown in FIG. 6, the panel subsystem may include a power supply panel, an interface board, a display driving board, a backlight panel, a touch-pad, and a display module. The interface board includes a second board connector, a direct-current power supply control unit, a backlight control unit, a touch control unit, and a display control unit. The panel subsystem is connected with the host subsystem through the second board connector. The second board connector may be a JAETX24 socket interface. The JAETX24 socket interface includes 80 pins, thus requirements on the number of signal wires between the panel subsystem and the host subsystem may be met.

Figure 7:
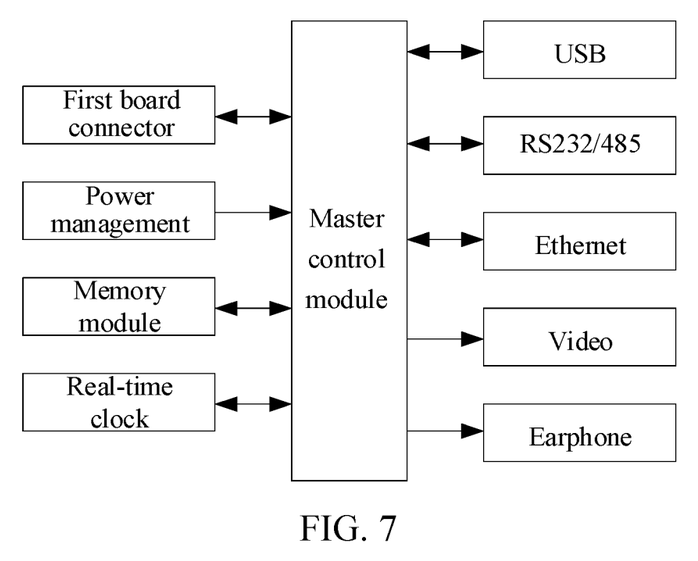
FIG. 7 is a schematic structural diagram of a host subsystem according to an embodiment of the present disclosure.

FIG. 7 is a schematic structural diagram of a host subsystem of a pluggable display system according to an embodiment of the present disclosure. As shown in FIG. 7, the host subsystem may include a master control module (System on Chip (SoC)), a first board connector, a power management module, a memory module, a real-time clock module, a Universal Serial Bus (USB) interface module, an RS232/485 interface module, an Ethernet interface module, a video interface module, and an earphone interface module. The master control module is connected with each of other modules on the host subsystem, and is connected with the panel subsystem through the first board connector and the second board connector. The memory module may include at least one of a Double Data Rate (DDR) module and an Embedded Multi Media Card (eMMC) module. The video interface module may include a High Definition Multimedia Interface (HDMI) module.

Figure 8:
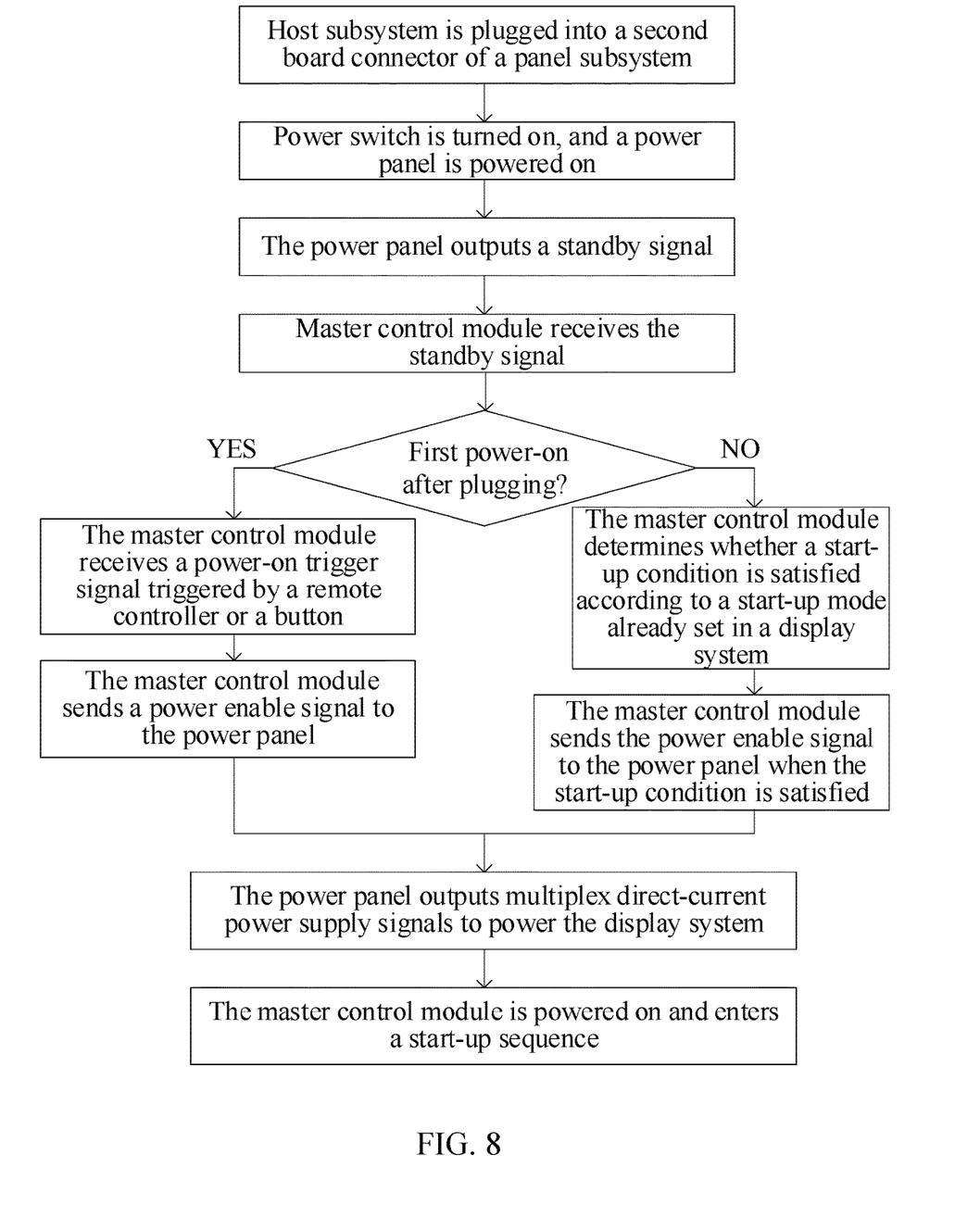
FIG. 8 is a flowchart of powering on a display system according to an embodiment of the present disclosure.

FIG. 8 is a flowchart of powering on a display system according to an embodiment of the present disclosure. As shown in FIG. 8, the host subsystem is plugged into the second board connector through the first board connector. A power switch of the power supply panel is turned on, and the power supply panel is powered on by a 220V alternating current. The power supply panel outputs a standby signal. After receiving the standby signal, the master control module determines whether the present power-on of the power supply panel is first power-on after the plugging of the system. If the present power-on of the power supply panel is the first power-on after the plugging of the system, the master control module receives a start-up trigger signal triggered by a remote controller or a button. The master control module sends a power enable signal to the power supply panel after receiving the start-up trigger signal. If the present power-on of the power supply panel is not the first power-on after the plugging of the system, the master control module determines whether a start-up condition is satisfied according to a start-up mode set in the display system. The master control module sends the power enable signal to the power supply panel when the start-up condition is satisfied. When receiving the power enable signal, the power supply panel converts an alternating-current voltage signal input by the external power supply into multiplex direct-current voltage signals, such as 12V, 5V and 24V direct-current power supply signals, wherein part of the multiplex direct-current voltage signals are provided for the panel subsystem, and the other part of the multiplex direct-current voltage signals are provided for the host subsystem through the connection between the second board connector and the first board connector. The master control module is powered on and enters a start-up sequence. The master control module sequentially starts a loader, kernel, etc., of the system. The master control module outputs a brightness control signal and a light emitting enable/disable signal to the backlight panel to turn on a display screen. As such, the master control module completes the start-up.

Figure 9:
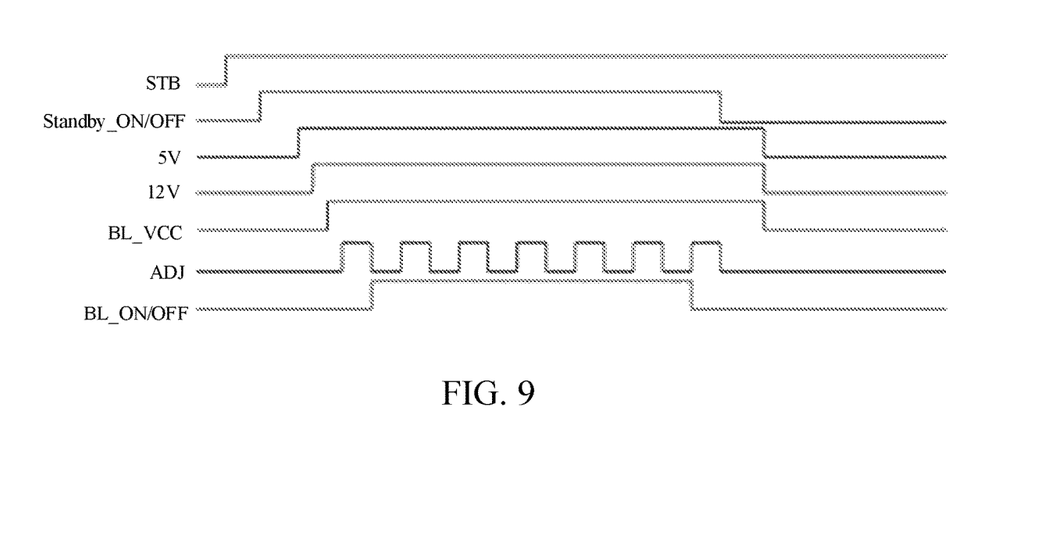
FIG. 9 is a timing sequence diagram of part of signals in power-on and power-off flows of a display system according to an embodiment of the present disclosure.

FIG. 9 is a timing sequence diagram of part of signals in power-on and power-off flows of a display system according to an embodiment of the present disclosure. As shown in FIG. 9, a power switch of a power supply panel is turned on, and the power supply panel is powered on. The power supply panel outputs a standby signal STB. In such case, only a basic low-power-consumption control circuit, such as a remote control circuit, in the host subsystem works. If the present power-on of the power supply panel is first power-on after the plugging of the system, a trigger signal (such as a remote controller signal) is waited to be received. A power enable signal Standby_ON is sent to the power supply panel if the trigger signal is received. If the present power-on of the power supply panel is not the first power-on after the plugging of the system, a start-up mode may already be set in the system. In such case, the master control module sends a power enable signal Standby_ON to the power supply panel when determining that a start-up condition is satisfied. The control signal Standby_ON is an input enable signal of the power supply panel. In case of a high level, the power supply panel turns on an AC-DC circuit and outputs a direct-current voltage. The power supply panel sequentially outputs voltage signals of 5V, 12V, BL_VCC (backlight power supply), etc., according to a sequence setting. The master control module sequentially starts a loader, kernel, etc., of the system. The master control module outputs a brightness control signal ADJ and a light emitting enable signal BL_ON to the backlight panel to turn on the display screen. As such, the master control module is started up. The master control module, if receiving a request of disconnecting the first board connector from the second board connector or a power-off request, outputs a light emitting disable signal BL_OFF to the backlight panel, and then outputs a power disable signal Standby_OFF to the power supply panel. The backlight panel controls the screen to be turned off when receiving the light emitting disable signal. The power supply panel stops outputting other direct-current power supply signals except the standby signal STB when receiving the power disable signal Standby_OFF.

Button or remote-control-based start is entered by default in case of the first power-on after the plugging of the system. After the display system is started up, the user may set power-on auto-start in system settings to realize a power-on auto-start function after power-on next time.

Table 2 shows an example of indexes signals and signal wires of a power interface according to an embodiment of the present disclosure.

TABLE 2

| Power interface | | | |
|---|---|---|---|
| Index | Signal | Index | Signal |
| 1 | Standby_ON/OFF | 2 | STB |
| 3 | GND | 4 | GND |
| 5 | ADJ | 6 | BL_ON/OFF |
| 7 | GND | 8 | GND |
| 9 | 5 V | 10 | 5 V |
| 11 | GND | 12 | GND |
| 13 | BL_VCC | 14 | BL_VCC |
| 15 | GND | 16 | GND |
| 17 | 12 V | 18 | 12 V |
| 19 | GND | 20 | GND |

As shown in Table 2, STB represents the standby signal sent to the master control module by the power supply module after the power supply module is powered on. Standby_ON/OFF represents the power enable/disable signal sent to the power supply module by the master control module to enable the power supply panel to or not to output the multiplex direct-current power supply signals. GND represents a zero potential of the above-mentioned power supply. ADJ represents the brightness control signal sent to the backlight module by the master control module. BL_ON/OFF represents the light emitting enable/disable signal sent to the backlight module by the master control module. 5V represents a controlled 5V power supply signal. BL_VCC represents a power supply signal of the backlight panel. 12V represents a controlled 12V power supply signal.

Table 3 shows an example of indexes of signals and signal wires of a backlight interface according to an embodiment of the present disclosure.

TABLE 3

| Backlight interface | |
|---|---|
| Index | Signal |
| 1 | BL_VCC |
| 2 | BL_VCC |
| 3 | ADJ |
| 4 | BL_ON/OFF |
| 5 | GND |
| 6 | GND |

As shown in Table 3, ADJ represents the brightness control signal sent to the backlight module by the master control module. BL_ON/OFF represents the light emitting enable/disable signal sent to the backlight module by the master control module. BL_VCC represents the power supply signal of the backlight panel.

Tables 4 and 5 show an example of signals and pins of a touch interface according to an embodiment of the present disclosure.

TABLE 4

Touch interface 1

| Index | Signal |
|---|---|
| 1 | VCC |
| 2 | USB_DM |
| 3 | USB_DP |
| 4 | GND |

TABLE 5

Touch interface 2

| Index | Signal |
|---|---|
| 1 | VCC |
| 2 | SCL |
| 3 | SDA |
| 4 | INT |
| 5 | RST |
| 6 | GND |

As shown in Tables 4 and 5, the touch interface includes a touch interface 1 and a touch interface 2. The touch interface 1 includes power supplies VCC and GND and signals USB D M and USB DP. The touch interface 2 includes power supplies VCC and GND, Inter-Integrated Circuit (I2C) buses SCL and SDA, an interrupt signal INT, and a reset signal RST.

Table 1 shows a signal set between the panel subsystem and the host subsystem designed using the JAE TX25A plug interface (80-pin) and the JAE TX24A socket interface in the present disclosure, which includes: main power supply signals 12V and GND; VbyOne display bus control signals VBO_SCL and VBO_SDA, a plugging status detection signal VBO_HPTDN, a clock locking status recovery signal VBO_LOCKN, and eight paths of VbyOne data differential signals VBO0 to VBO7; a power supply status output signal PWR_Status; a hot plug signal (plugging status detection for the master control module) Hot_Plug; a plug power supply signal (plugging detection power supply for the master control module) Plug_VCC; a button input pin AD Key; an infrared input pin IR; a brightness control signal (backlight control output) ADJ of the backlight module; a light emitting enable/disable signal BL_ON/OFF; USB touch function signals TP_USB_DM and TP_USB_DP; touch I2C signals TP_SCL and TP_SDA, a touch interrupt signal TP_INT, and a touch reset signal TP_RST; output signals of left and right channels of a speaker; a fan control signal SYS_FAN; a power enable/disable signal Standby_ON/OFF; a standby signal STB; 5V controlled power; and Reserved representing a reserved pin, which may be defined as practically required.

The signals and signal indexes shown in Table 1 are only an example. The above-mentioned signals may be replaced according to scenes. For example, a VbyOne interface may be replaced with an HDMI or DP interface. Alternatively, other interfaces such as USB2.0, USB3.0 and an Ethernet interface may be added.

Figure 10:
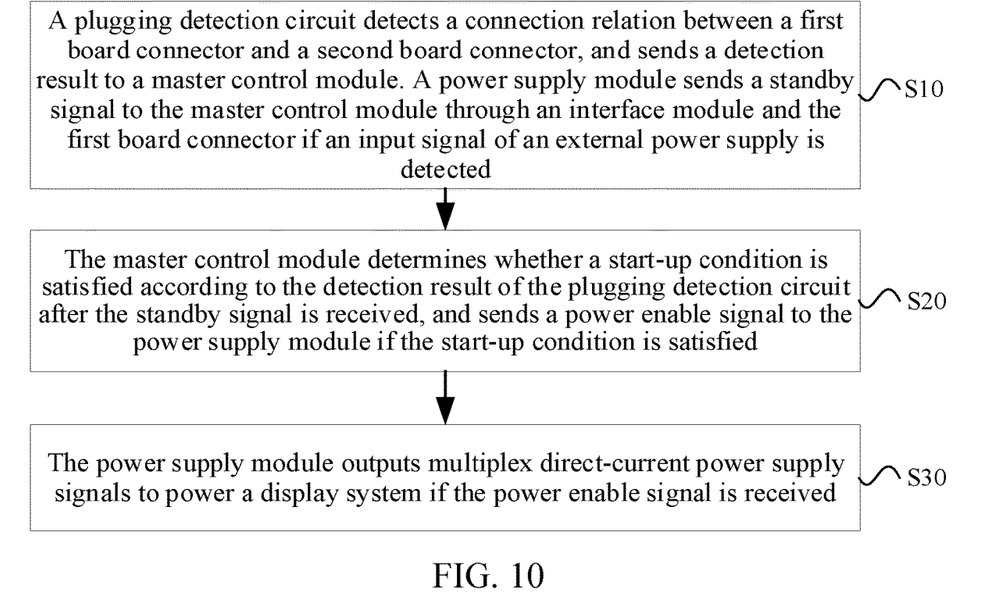
FIG. 10 is a flowchart of a power-on method for a pluggable display system according to an embodiment of the present disclosure.

FIG. 10 is a flowchart of a power-on method for a pluggable display system according to an embodiment of the present disclosure. As shown in FIG. 10, the power-on method for a pluggable display system may include the following steps.

In S10, a plugging detection circuit detects a connection relation between a first board connector and a second board connector, and sends a detection result to a master control module. A power supply module sends a standby signal to the master control module through an interface module and the first board connector if an input signal of an external power supply is detected.

In S20, the master control module determines whether a start-up condition is satisfied according to the detection result of the plugging detection circuit after receiving the standby signal, and sends a power enable signal to the power supply module if the start-up condition is satisfied.

In S30, the power supply module outputs multiplex direct-current power supply signals to power the display system if the power enable signal is received.

According to the above-mentioned implementation mode provided in the present disclosure, the display system provides plugging information for the master control module through the plugging detection circuit, and provides power-on information of a power supply for the master control module through a power-on detection mechanism of the power supply module. The master control module determines whether the start-up condition is satisfied according to the detection result of the plugging detection circuit after the power supply module is powered on, and sends the power enable signal to the power supply module if the start-up condition is satisfied. The power supply module outputs multiplex direct-current power supply signals to power the display system according to the power enable signal sent by the master control module. The power supply module powers the display system under the control of the master control module rather than directly powering the display system after powered on, so that damages possibly brought by plugging operations are avoided, and the electrical safety of the system is ensured.

In some exemplary implementation modes, the operation that the master control module determines whether the start-up condition is satisfied according to the detection result of the plugging detection circuit includes:

If the first board connector is connected with the second board connector for the first time, or the master control module has never sent a power enable signal to the power supply module after a last disconnected status between the first board connector and the second board connector is switched to a connected status, the master control module determines whether the start-up condition is satisfied according to a default start-up mode.

If the master control module has ever sent a power enable signal to the power supply module after the last disconnected status between the first board connector and the second board connector is switched to the connected status, the master control module queries start-up mode setting information, determines whether the start-up condition is satisfied according to the start-up mode set by the user if a user sets a start-up mode, and determines whether the start-up condition is satisfied according to the default start-up mode if the user does not set the start-up mode.

In some exemplary implementation modes, the master control module, if receiving the start-up mode setting information input by the user after the display system is started up, further stores the information, and holds the default start-up mode of powering on the system if the start-up mode setting information input by the user is not received.

In some exemplary implementation modes, the start-up mode includes a manual mode and an automatic mode.

The automatic mode includes a delayed start mode and a non-delayed start mode.

The default start-up mode for starting up the system includes the manual mode or the delayed start mode.

In some exemplary implementation modes, the master control module sends a power disable signal to the power supply module when receiving a request of disconnecting the first board connector from the second board connector or a power-off request. The power supply module stops outputting other power supply signals except the standby signal when receiving the power disable signal.

In some exemplary implementation modes, the master control module loads a software system after power-on, and sequentially outputs a brightness control signal and a light emitting enable signal to a backlight module through the first board connector and the interface module after the loading is completed. The backlight module provides a light source signal for a display module under the control of the master control module. The master control module sends a light emitting disable signal to the backlight module when receiving the request of disconnecting the first board connector from the second board connector or the power-off request. The backlight module controls a screen to be turned off when receiving the light emitting disable signal.

In some exemplary implementation modes, the operation that the power supply module outputs multiplex direct-current power supply signals to power the display system includes that: the power supply module converts an alternating-current voltage signal input by the external power supply into multiplex direct-current voltage signals for output, wherein part of the multiplex direct-current voltage signals are provided for a panel subsystem, and the other part of the multiplex direct-current voltage signals are provided for a host subsystem through the connection between the second board connector and the first board connector.

It can be understood by those of ordinary skills in the art that all or some steps in the method disclosed above and function modules/units in the system and the apparatus may be implemented as software, firmware, hardware, and proper combinations thereof. In a hardware implementation mode, a division between function modules/units mentioned in the above description does not always correspond to a division between physical components. For example, a physical component may have multiple functions, or a function or step may be performed cooperatively by multiple physical components. Some or all components may be implemented as software executed by a processor such as a digital signal processor or a microprocessor, or implemented as hardware, or implemented as integrated circuits such as application specific integrated circuits. Such software may be distributed in a computer-readable medium, and the computer-readable medium may include a computer storage medium (or a non-transitory medium) and a communication medium (or a temporary medium). As known to those of ordinary skills in the art, term computer storage medium includes volatile/nonvolatile and removable/irremovable media implemented in any method or technology for storing information (for example, a computer-readable instruction, a data structure, a program module, or other data). The computer storage medium includes, is but not limited to, a Random Access Memory (RAM), a Read-Only Memory (ROM), an Electrically Erasable Programmable ROM (EEPROM), a flash memory or other memory technologies, a Compact Disc Read-Only Memory (CD-ROM), a Digital Video Disk (DVD) or other compact discs, a cassette, a magnetic tape, a disk memory or other magnetic storage devices, or any other medium configurable to store expected information and accessible for a computer. In addition, it is known to those of ordinary skills in the art that the communication medium usually includes a computer-readable instruction, a data structure, a program module or other data in a modulated data signal of, for example, a carrier or another transmission mechanism, and may include any information transmission medium.

The invention claimed is:

1. A pluggable display system, comprising:
a host subsystem and a panel subsystem, wherein the host subsystem comprises a first board connector, a master control module and a plugging detection circuit, and the panel subsystem comprises a power supply module and an interface module, wherein the interface module comprises a second board connector;
the plugging detection circuit is configured to detect a connection relation between the first board connector and the second board connector and send a detection result to the master control module;
the master control module is connected with the first board connector and the plugging detection circuit, and is configured to determine whether a start-up condition is satisfied according to the detection result of the plugging detection circuit if receiving a standby signal, and send a power enable signal to the power supply module if the start-up condition is satisfied; and
the power supply module is connected with the interface module, and is configured to send the standby signal to the master control module through the interface module and the first board connector if an input signal of an external power supply is detected and output multiplex Direct-Current (DC) power supply signals to power the display system if the power enable signal is received,
wherein
the master control module is further configured to, if receiving start-up mode setting information input by a user after the display system is powered on, store the information, and hold a default start-up mode for starting up the display system if the start-up mode setting information input by the user is not received.

2. The display system according to claim 1, wherein
the host subsystem has a detachable structure, and the host subsystem is detachably connected with the panel subsystem through the first board connector and the second board connector.

3. The display system according to claim 1, wherein
the master control module is configured to determine whether the start-up condition is satisfied according to the detection result of the plugging detection circuit in the following manners:
if the first board connector is connected with the second board connector for the first time, or the master control module has never sent the power enable signal to the power supply module after a last disconnected status between the first board connector and the second board connector is switched to a connected status, the master control module determines whether the start-up condition is satisfied according to the default start-up mode; and
if the master control module has ever sent a power enable signal to the power supply module after the last disconnected status between the first board connector and the second board connector is switched to the connected status, the master control module queries the start-up mode setting information, determines whether the start-up condition is satisfied according to a start-up mode set by the user if the user sets the start-up mode, and determines whether the start-up condition is satisfied according to the default start-up mode if the user does not set the start-up mode.

4. The display system according to claim 1, wherein
a start-up mode comprises a manual mode and an automatic mode;
the automatic mode comprises a delayed start mode and a non-delayed start mode; and
the default start-up mode for starting up the display system comprises the manual mode or the delayed start mode.

5. The display system according to claim 1, wherein
the master control module is further configured to send a power disable signal to the power supply module when receiving a request of disconnecting the first board connector from the second board connector or a power-off request; and
the power supply module is further configured to stop outputting other power supply signals except the standby signal when receiving the power disable signal.

6. The display system according to claim 1, wherein
the panel subsystem further comprises a display driving module, a display module, and a backlight module;
the master control module is further configured to load a software system after power-on and sequentially output a brightness control signal and a light emitting enable signal to the backlight module through the first board connector and the interface module after loading is completed; and
the backlight module is connected with the display module and the interface module, is connected with the master control module through the interface module and the second board connector, and is configured to provide a light source signal for the display module under control of the master control module.

7. The display system according to claim 6, wherein
the master control module is further configured to send a light emitting disable signal to the backlight module through the first board connector and the interface module when receiving a request of disconnecting the first board connector from the second board connector or a power-off request; and
the backlight module is further configured to control a screen to be turned off when receiving the light emitting disable signal.

8. The display system according to claim 1, wherein
the plugging detection circuit comprises a first resistor, a second resistor and a first diode;
a first end of the first resistor is connected with a plug power supply signal terminal of the first board connector, and a second end of the first resistor is connected with a cathode of the first diode; an anode of the first diode is connected with a first power supply signal terminal; and
a first end of the second resistor is connected with a hot plug signal terminal of the first board connector, and a second end of the second resistor is grounded; as an output end of the plugging detection circuit, the hot plug signal terminal is further connected with the master control module;
wherein the first power supply signal terminal is configured to provide an uninterrupted power supply signal.

9. The display system according to claim 8, wherein
the host subsystem further comprises a real-time clock module and a real-time clock power supply circuit; the real-time clock module is connected with the master control module, and is configured to continuously record time information and send the time information to the master control module; and
the real-time clock power supply circuit is configured to determine a direct-current power supply signal output by the power supply module as an input power supply signal when the power supply module is powered on, determine a direct-current power supply signal output by a battery as the input power supply signal when the power supply module is off, generate an uninterrupted power supply signal according to the input power supply signal, and output the uninterrupted power supply signal to the real-time clock module at an output end of the real-time clock power supply circuit.

10. The display system according to claim 9, wherein
the real-time clock power supply circuit comprises a direct-current voltage conversion sub-circuit, a second diode, a third diode and a first capacitor;
an input end of the direct-current voltage conversion sub-circuit is connected with a standby signal terminal of the first board connector, and an output end of the direct-current voltage conversion sub-circuit is connected with an anode of the second diode; the direct-current voltage conversion sub-circuit is configured to perform voltage reduction processing on an input direct-current voltage signal to generate a new direct-current voltage signal for output; a cathode of the second diode is connected with the output end of the real-time clock power supply circuit;
an anode of the third diode is connected with a cathode of the battery, and a cathode of the third diode is connected with the output end of the real-time clock power supply circuit; a cathode of the battery is grounded; and
a first electrode of the first capacitor is connected with the output end of the real-time clock power supply circuit, and a second electrode of the first capacitor is grounded;
wherein a voltage value of the standby signal output at the standby signal terminal when the power supply module is powered on is higher than a cathode voltage of the battery.

11. The display system according to claim 10, wherein
the first power supply signal terminal is connected with the output end of the real-time clock power supply circuit.

12. A power-on method for the pluggable display system according to claim 1, comprising:
the plugging detection circuit detecting a connection relation between the first board connector and the second board connector, and sending a detection result to the master control module; the power supply module sending a standby signal to the master control module through the interface module and the first board connector if an input signal of an external power supply is detected;
the master control module determining whether a start-up condition is satisfied according to the detection result of the plugging detection circuit after receiving the standby signal, and sending a power enable signal to the power supply module if the start-up condition is satisfied; and the power supply module outputting multiplex Direct-Current (DC) power supply signals to power the display system if receiving the power enable signal.

13. The method according to claim 12, wherein
the master control module determining whether the start-up condition is satisfied according to the detection result of the plugging detection circuit comprises:
if the first board connector is connected with the second board connector for the first time, or the master control module has never sent the power enable signal to the power supply module after a last disconnected status between the first board connector and the second board connector is switched to a connected status, the master control module determining whether the start-up condition is satisfied according to a default start-up mode; and
if the master control module has sent the power enable signal to the power supply module after the last disconnected status between the first board connector and the second board connector is switched to the connected status, the master control module querying the start-up mode setting information, determining whether the start-up condition is satisfied according to the start-up mode set by a user if the user sets a start-up mode, and determining whether the start-up condition is satisfied according to the default start-up mode if the user does not set the start-up mode.

14. The method according to claim 12, further comprising:
the master control module sending a power disable signal to the power supply module when a request of disconnecting the first board connector from the second board connector or a power-off request is received; and
the power supply module stopping outputting other power supply signals except the standby signal when the power disable signal is received.

15. The display system according to claim 3, wherein
the start-up mode comprises a manual mode and an automatic mode;
the automatic mode comprises a delayed start mode and a non-delayed start mode; and
the default start-up mode for starting up the display system comprises the manual mode or the delayed start mode.

* * * * *